United States Patent [19]
Martin et al.

[11] 3,943,295
[45] Mar. 9, 1976

[54] APPARATUS AND METHOD FOR RECOGNIZING WORDS FROM AMONG CONTINUOUS SPEECH

[75] Inventors: Thomas B. Martin, Delran; Marvin B. Herscher, Cherry Hill, both of N.J.

[73] Assignee: Threshold Technology, Inc., Delran, N.J.

[22] Filed: July 17, 1974

[21] Appl. No.: 489,231

[52] U.S. Cl. ............................................. 179/1 SA
[51] Int. Cl.² ............................................ G10L 1/00
[58] Field of Search .......... 179/15 BY, 15 BS, 1 SB, 179/1 SA; 178/69.5 R; 340/146.3 Q

[56] References Cited
UNITED STATES PATENTS

| | | |
|---|---|---|
| 3,592,969 | 7/1971 | Yoshino............................ 179/1 SA |
| 3,770,892 | 11/1973 | Clapper............................ 179/1 SA |

*Primary Examiner*—Thomas A. Robinson
*Attorney, Agent, or Firm*—Martin Novack

[57] ABSTRACT

An apparatus and method for recognizing the occurrence of a command word from among input speech that may be continuous in form. In accordance with the invention, means are provided for generating feature signals which depend on the features of an input word being spoken. The feature signals are processed to determine the time interval of occurrence of a predetermined sequence of features. Also provided is a means for comparing the feature signals which occur during the determined time interval with a stored set of features that are expected to occur characteristically during the command word to determine the degree of correlation therebetween.

7 Claims, 8 Drawing Figures

APPARATUS AND METHOD FOR RECOGNIZING WORDS FROM AMONG CONTINUOUS SPEECH

BACKGROUND OF THE INVENTION

This invention relates to speech recognition apparatus and, more particularly, to an apparatus for recognizing the occurrence of a specific word or words from among continuous speech.

There have been previously developed various equipments that attempt to recognize limited vocabularies of spoken words by analysis of acoustic events. Typically, such equipments are envisioned as being useful in "voice command" applications wherein, upon recognizing particular words, the equipment produces electrical signals which control the operation of a companion system. For example, a voice command could be used to control a conveyor belt to move in a specified manner or may control a computer to perform specified calculations.

Previous efforts to develop automatic methods of speech recognition have had limited success and have led to the realization of the exceedingly complex nature of speech communication. Normal speech has a high information content with considerable variability from speaker to speaker and some variability even in the same word when spoken by the same individual. Therefore, a "perfect" recognition scheme is unattainable since the nature of the speech signal to be recognized cannot be precisely defined. As a result, the preferred past schemes have been empirical approaches which have yielded at least a reasonable level of confidence, from a statistical standpoint, that a particular spoken word corresponded to a selected one of a limited machine vocabulary. The desirability of such schemes are thus not determinable by theoretical examination, but rather by a straightforward measure of recognition accuracy over an extended period of operation.

For various reasons, most prior art systems have been found unsuitable for practical applications. One of the prime reasons has been the sheer complexity of equipments that attempted to make an overly rigorous analysis of received speech signals. In addition to the expense and appurtenant unreliability, such systems have a tendency to establish highly complicated and restrictive recognition criteria that may reject normal variations of the system vocabulary words. Conversely, some equipments suffer from establishing recognition criteria that are too easily met and result in the improper acceptance of extraneous words not included in the preselected vocabulary of the equipment.

In the copending application Ser. No. 291,051, filed Sept. 21, 1972, and assigned to the same assignee as the present application, there is disclosed an apparatus which receives spoken input "training" words and a subsequent spoken input "command" word and generates a correlation function that is indicative of the resemblance of the command word to each training word. A feature extraction means processes received input words and generates digital feature output signals on particular ones of a number of feature output lines, the particular ones depending on the characteristic features of the word being spoken. The status of the feature signals which occur during each training word are stored as a normalized time dependent matrix. Subsequently, the status of the feature signals which occur during a command word are also stored as a normalized time dependent matrix. The command word matrix is then compared, member by member, with each training word matrix and a correlation figure is generated for each comparision. If a sufficiently high correlation is found between the command word matrix and a particular training word matrix, the command word is deemed to correspond to the particular training word. This type of system has been found to operate most satisfactorily in applications where command words are spoken in "isolation"; i.e., where there are discernable pauses between words, the pauses defining the word boundaries. Generally, circuitry is provided which senses the onset of speech after a pause and which then senses the next substantial absence of speech. These occurrences are considered the boundaries of a word and the feature events which occur between these boundaries are used to form the matrix referred to above. Clearly, any system wherein distinct pauses are required to determine word boundaries will necessarily have severely limited capability for recognizing words from among natural continuous speech since there is often little or no discernable pause between words in natural speech.

In the copending application Ser. No. 264,232, filed June 19, 1972, and assigned to the same assignee as the present application, there is described a type of system that has been employed in the past with some success to recognize the occurrence of words during continuous or connected speech. The technique utilized is a sequential analysis of phonetic events. A sequential logic "chain" is provided for each word to be recognized. Each chain includes a number of logic stages, one stage being provided for each phonetic event of the word to be recognized. The logic stages are configured in a series arrangement and selectively enabled in such a manner that they are sequentially activated when a particular sequence of phonetic events (or features) occurs. As a simplified example, the word "red" can be expressed by the phonetic sequence /r/ → /ϵ/ → /d/. Accordingly, a logic chain employed to recognize the word red would have three logic stages coupled in series, the first stage being enabled by the sensing of an /r/ sound, the second stage being enabled by the sensing of an /ϵ/ sound and the third stage being enabled by the sensing of a /d/ sound. Of course, the second and third stages would each also require the prior stage to have been enabled as a precondition. When the last stage is enabled, the system indicates that the word red has been spoken since the phonemes /r/, /ϵ/, and /d/ are known to have occurred in the listed order. As explained in abovereferenced application, the system typically requires that the phonemes occur within certain time constraints and provides for a logic chain to be "reset" (i.e., start over from scratch in looking for its vocabulary word) upon occurrence of certain acoustic features which would indicate a strong improbability that the sought vocabulary word is being uttered.

It will be appreciated that the sequential logic type of system as described has a capability of recognizing vocabulary words among continuous speech, even when there is no discernable pause before or after the word is spoken. This is because the system is designed to sense the occurrence of a particular sequence of phonemes and no word boundaries need occur to isolate the word so an analysis can be made. Notwithstanding this advantage, it has been found that the described type of sequential logic system has some recognition deficiencies that could use improvement. As alluded to above in general terms, speech recognition systems sometimes establish an overly restrictive recognition criteria, and this is often the case with the sequential logic type of system. Specifically, if the sequential logic system requires a certain restrictive sequence of phonemes for recognition, the absence of even a single phoneme from the prescribed sequence will prevent a recognition indication. In many cases such restriction causes a sought word to go unrecognized since contextual effects can easily cause even the same speaker to extraneously insert or omit a phoneme (or, more precisely, a phonetic feature) when uttering the same word on different occasions. This type of error lowers the systems recognition rate. The recognition rate can obviously be raised by relaxing the recognition criteria and allowing various alternative sequences to trigger recognition indications. However, such relaxation is found to increase the occurrence of "false alarms"; i.e. false triggerings of recognition indications by words (or phonetic sequences in adjacent words) that are similar to a word being sought.

It is an object of the present invention to provide a speech recognition apparatus which is capable of recognizing words from among continuous speech and which exhibits a relatively high recognition rate and a relatively low false alarm rate.

SUMMARY OF THE INVENTION

The present invention is directed to an apparatus and method for recognizing the occurrence of a command word from among input speech that may be continuous in form. In accordance with the invention, means are provided for generating feature signals which depend on the features of an input word being spoken. The feature signals are processed to determine the time interval of occurrence of a predetermined sequence of features. Also provided is a means for comparing the feature signals which occur during the determined time interval with a stored set of features that are expected to occur characteristically during the command word to determine the degree of correlation therebetween.

Further features and advantages of the invention will become more readily apparent from the following detailed description when taken in conjunction with the accompanying drawings.

DESCRIPTION OF THE PREFERRED EMBODIMENTS

Figure 1:
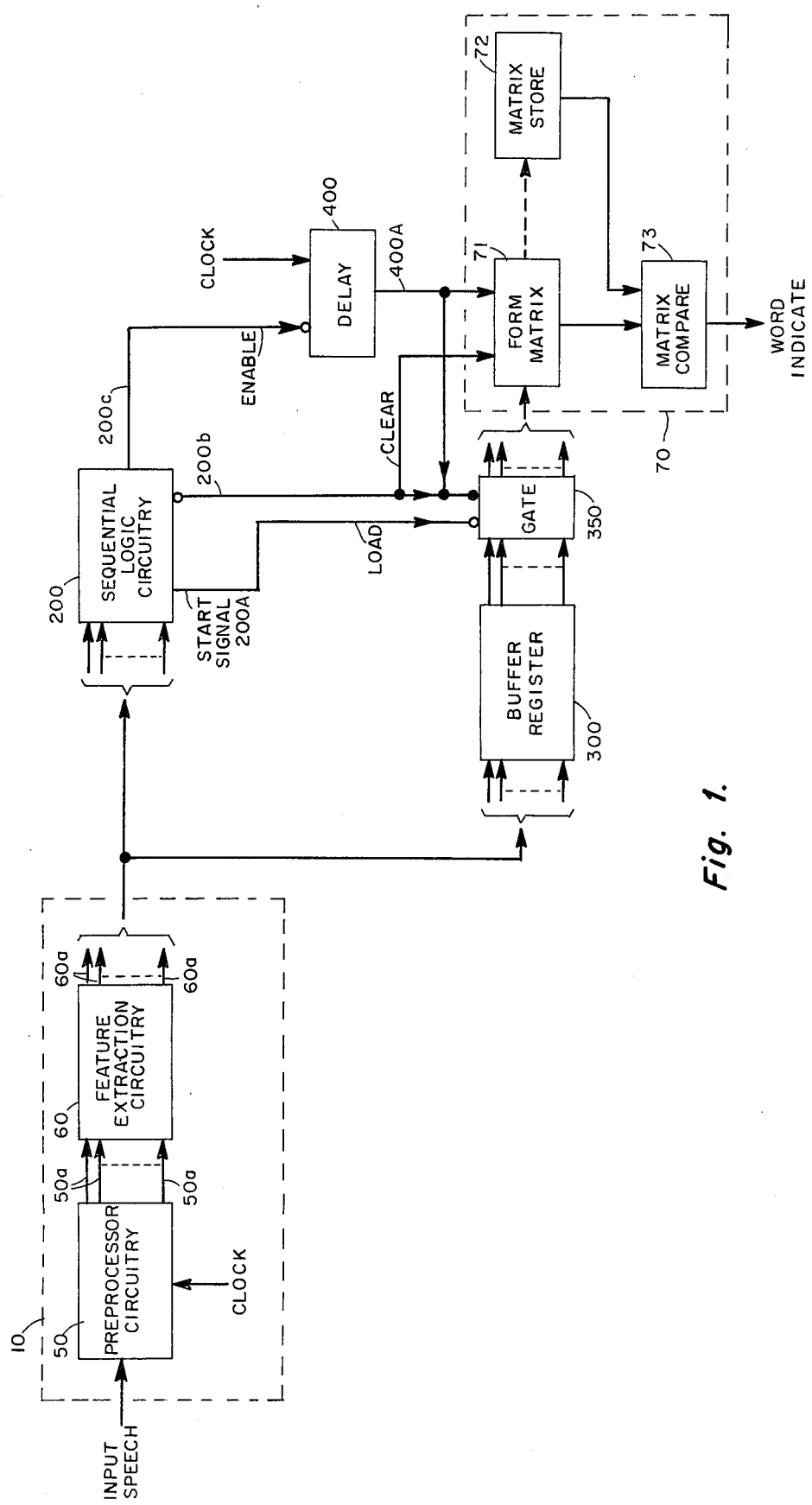
FIG. 1 is a block diagram of an apparatus in accordance with an embodiment of the invention.

Referring to FIG. 1, there is shown a simplified functional block diagram of an apparatus in accordance with the invention. Input spoken words are received by a feature extraction means 10 which comprises preprocessor circuitry 50 and feature extraction circuitry 60. (As referred to herein, the terms "input spoken words", "spoken works", "speech", or the like are intended to generically include any acoustical or electrical representation of communicative sounds. Typically, the circuitry 50 is adapted to receive word communications directly from an individual, or word-representative electrical signals from over a telephone line or tape recorder.) The preprocessor circuitry 50 utilizes a bank of bandpass filters to translate speech into a plurality of spectral component signals on lines 50a. The signals on lines 50a are received by the feature extraction circuitry 60 which generates feature output signals on particular ones of a number of feature output lines 60a, the particular ones depending on the features contained in the speech being received. Signals on the feature output lines may represent, for example, the presence of commonly used vowel or consonant sounds. As will be further described, the circuitry 50 and 60 may be of a type that is known in the prior art.

The feature output lines 60a are coupled to sequential logic circuitry 200 and also to a buffer register 300 whose output is coupled via a gate 350 to processing circuitry, the functions of which are generally shown within the dashed enclosure 70. In the present embodiment the sequential logic circuitry 200 comprises a single sequential logic chain which is capable of recognizing the presence (more precisely, the probable presence) of a given command word from among input speech, even when the input speech is in the form of continuous or connected speech. The circuitry 200 generates an output on line 200C, denoted an "end signal", when the recognition criteria of the sequential logic chain is met. Preferably, the sequential logic chain will be configured so as to have a relatively "easy" criteria; i.e., criteria that is satisfied by any word having the general acoustic characteristics of the command word. As described in the Background portion of this specification, this would ordinarily result in an unacceptably high "false alarm" rate for a speech recognition equipment. In the present instance, however, this is an acceptable consequence since the sequential logic circuitry acts to effectively isolate candidates that can be identified with a relatively high degree of accuracy by the processing circuitry 70 as being the command word or not. The sequential logic circuitry provides timing information which specifies the beginning and end (or other identifiable points) of a command word candidate so that useful comparisons with stored information can be made to achieve accurate recognition.

As will be further described, the sequential logic circuitry 200 generates a "start signal" on a line 200A when an initial distinguishable feature of the command word is sensed. This signal enables gate 350 to begin loading the feature signals appearing on lines 60a into the processing circuitry 70. The buffer register 300 provides an effective delay which allows the initial feature signals loaded into circuitry 70 to be feature signals which occurred before the start signal on line 200A. In this manner, the phonetic events which occurred at the very beginning of the word are not lost. Also, a delay means 400, which may be digital counter, performs a similar function at the end of a word by allowing loading to continue for a specified period after the end signal has occurred on line 200C. After this specified period, a "finalize" signal on a line 400A disables the gate 350 and also indicates to the circuitry 70 that the loading of the candidate word has been completed. In most instances, the input speech that causes occurrence of a "start" signal on line 200A subsequently deviates from the recognition criteria of sequential logic circuitry 200 (i.e., when the input speech is substantially different from the command word) and this will cause generation of a "reset" signal on a line 200B (in a manner to be described). The reset signal functions to disable the gate 350 and to clear the information which had begun to be loaded into the processing circuitry 70.

When a "finalize" signal is received by processing circuitry 70, a time dependent matrix is formed, this function being represented by the block 71. The matrix members represent the status of the feature signals that occurred during the command word "candidate"; i.e., that occurred between the "load" and "finalize" signals generated by the sequential logic circuitry 200. Before commencing operation, another matrix had been stored in processing circuitry 70, as represented by the block 72. This other matrix has members which represent the atatus of the feature signals that are expected to occur characteristically during the command word. The two matrices are then compared, this function being represented by the block 73. The comparison is preferably performed on a member-by-member basis and results in a determination of the degree of correlation between the two matrices. If the degree of correlation is sufficiently high, the processing circuitry generates an indication that the command word has been recognized. In this manner, the basic feature trends are used for recognition rather than the overly restrictive criteria often necessitated by strictly sequential systems which require that specific features always be present. Thus, some speaker variation in the way the command word is spoken, as is often the case in different contexts, will generally not prevent recognition.

FIG. 2 illustrates, in some further detail, prior art feature extraction means which is of a type that is suitable for use as the feature extraction means 10 of FIG. 1. A full description of both the proprocessor circuitry 50 and the feature extraction circuitry 60 can be found in a publication entitled "Acoustic Recognition of A Limited Vocabulary of Continuous Speech" by T. B. Martin and published by University Microfilms, Ann Arbor, Michigan. It should be emphasized, however, that the present invention deals largely with already-processed feature signals and any suitable means for obtaining the feature signals can be employed. Accordingly, the extent of detail set forth herein is limited to that needed to facilitate understanding of the portions of the apparatus through inventive.

Figure 2A:
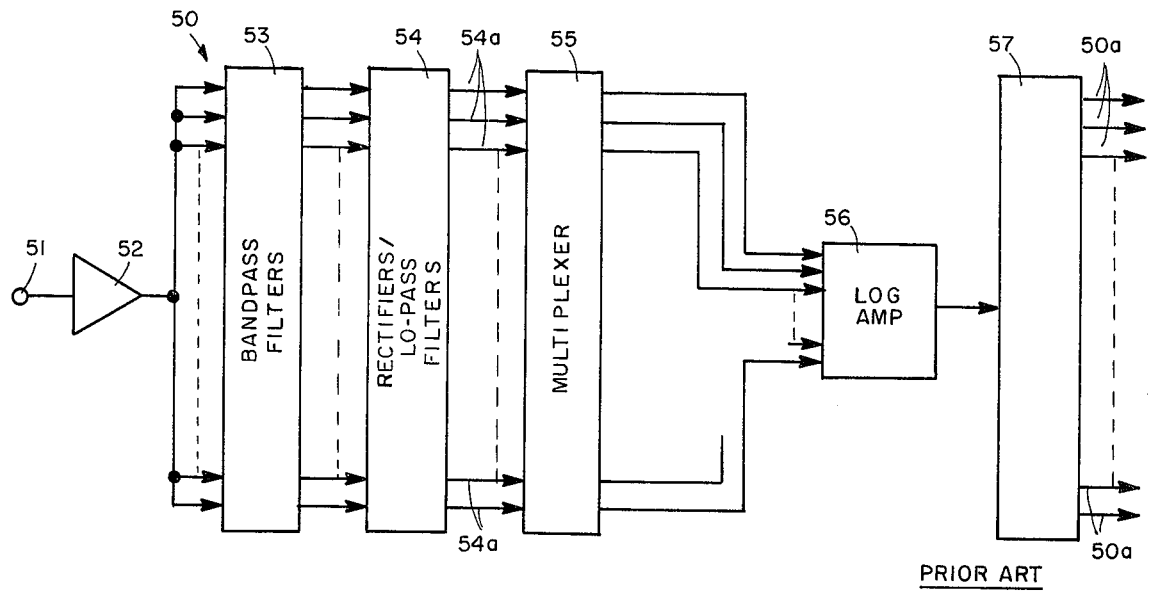
FIGS. 2A and 2B are block diagrams of prior art circuitry useful as the feature extraction portion of the invention.

FIG. 2A is a block diagram of the preprocessor circuitry 50. A transducer 51, typically a gradient microphone, receives input spoken words and produces time-varying electrical signals that are representative of the received sounds. The output of transducer 51 is coupled, via preamplifier 52, to nineteen contiguous bandpass filters in a filter bank 53. Each filter in the bank produces an output signal related to that portion of the input signal which lies in the range of frequencies passed by the particular filter. Typically, the filter center frequencies range from about 250 to about 7500 Hz with the lowest filter bandwidth being about 150 Hz.

The output of each filter in the bank 53 is individually coupled to a full wave rectivier and lowpass filter combination located in a rectifier/lowpass filter bank 54. After rectification and filtering, the outputs of the bank 54 essentially represent the energy levels of the input signal at about the center frequencies of each of the bankpass filters in the bank 53. Viewed in another way, the signals on lines 54a collectively represent the envelope of the energy vs. frequency spectrum of the received input signal taken over the frequency range of interest.

The nineteen channels of information on lines 54a are logarithmically compressed to produce the spectral component outputs on lines 50a of the preprocessor. Logarithmic compression facilitates subsequent processing in two ways. First, it provides dynamic range compression that simplifies the engineering design requirements of feature extraction circuitry 60. Secondly, by virtue of using logarithms, comparative ratios of the spectral component signals can be readily computed by subtraction. Ratios are desirable processing vehicles in that they are independent of changes in overall signal amplitudes. This property is particularly advantageous in a system where input speech of varying loudness is to be recognized.

In the diagram of FIG. 2A, a signal log amplifier 56 is time shared to avoid the necessity of using nineteen identical amplifiers to achieve compression. The outputs on 54a are effectively sampled by a multiplexer 55 and the sampled signals passed, one at a time, through the shared amplifier 56. A demultiplexer 57 then "reconstructs" compressed spectral component signals on lines 50a from the processed sampled signals. The sampling clock rate of the multiplexer and demultiplexer is above one KHz and is safely higher than is necessary to retain signal bandwidths. This technique of sharing a single logarithmic amplifier is known in the art and is disclosed, for example, in U.S. Pat. No. 3,588,363 of M. Herscher and T. Martin entitled "Word Recognition System for Voice Controller" as well as in the abovereferenced publication of T. Martin.

It will be recalled that the spectral component signals on lines 50a are entered into the feature extraction circuitry 60 (FIG. 1) which senses the presence of properties of the spectral component signals that correspond to preselected properties or "features" of input words. In the prior art feature extraction circuitry being described for illustration, this sensing of properties or "feature extraction" is achieved in part by deriving quantities known as "slope" and "broad slope" characteristics. These quantities give indication as to the polarity and magnitude of the slope of the input envelope when taken over specified segments of frequency spectrum. The manner in which these quantities are obtained is described in the above-referenced publication and patent.

Figure 2B:
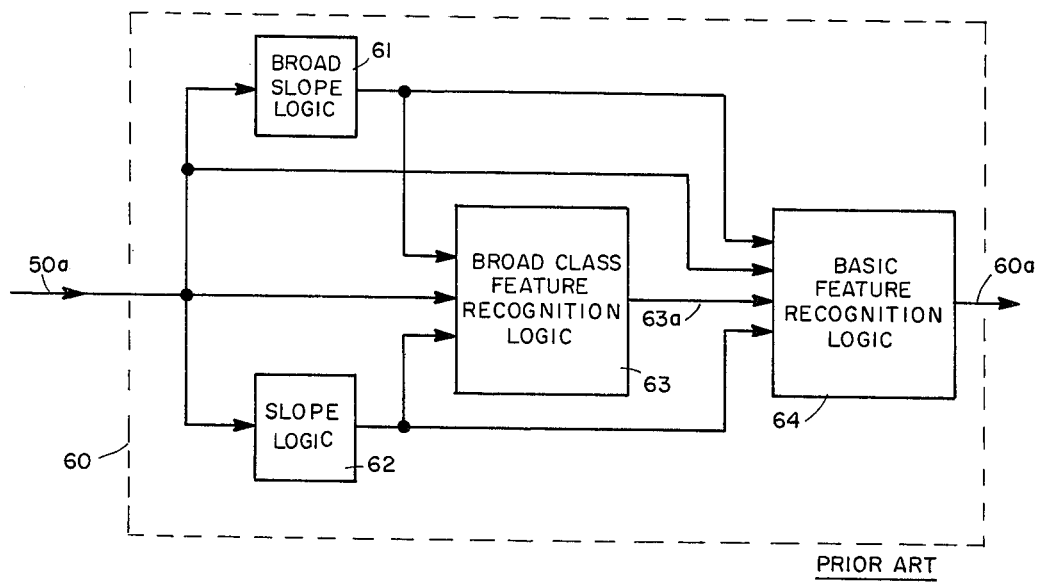

FIG. 2B shows a block diagram of the prior art feature extraction circuitry 60 which receives the spectral component signals on the lines 50a. The circuitry 60, which is also described in the referenced publication and patent, includes logic blocks 61 and 62 which derive sets of slope and broad slope quantities that are received by a "broad class feature" recognition logic block 63. The block 63 utilizes groups of operational amplifiers and appropriate peripheral circuitry to generate broad class feature signals 63a that indicate the presence of certain broadly classified phonetic characteristics in the input words. Examples of the broad classifications are "vowel/vowel like", "voicing only", "burst", "voiced noise-like consonant" etc. The signals 63a as well as the spectral component signals, slope, and broad slope signals are received by a "basic feature" recognition logic block 64. This block, which includes components that are similar in nature to the block 63, functions to generate the feature signals that indicate the presence of specific phonetic features (e.g. /I/, /s/, /θ/, / ʃ /) of the input spoken words. The block 64 will typically also include an intermediate block that derives "common group features" (e.g. "front vowel", "back vowel", "fricative", "stop consonant", etc.) and such common group features can be the most specific features derived for further processing by the system of FIG. 1. However, narrowly defined phonetic feature signals facilitiate explanation of subsequent circuitry, so the feature signals 60a will therefore be assumed to be of this form for portions of the description. It should be emphasized, however, that the invention to be described is not limited to any particular form of feature signal generation.

Figure 3A:
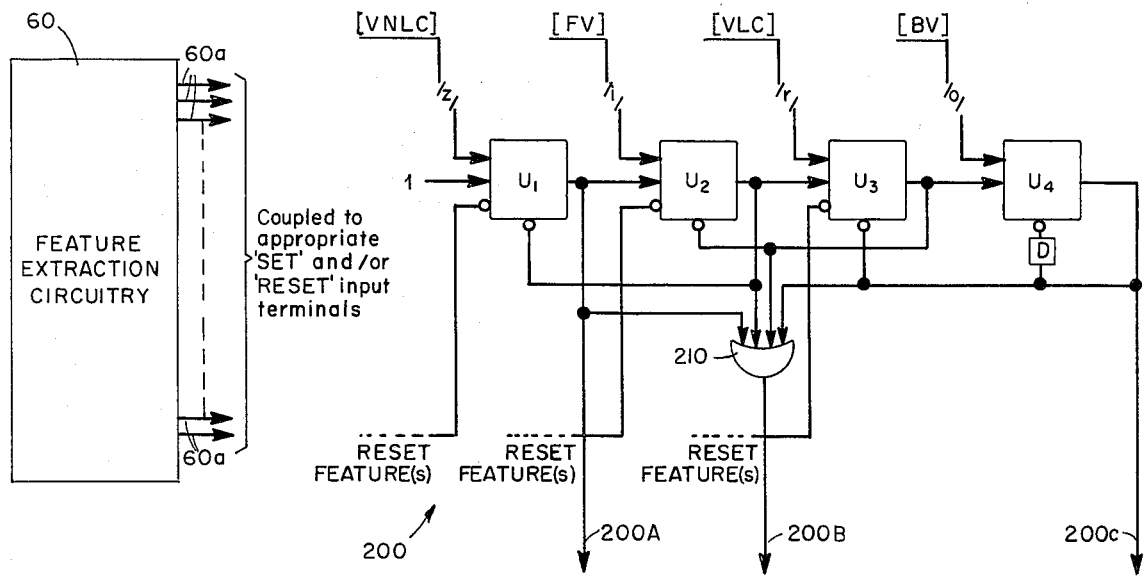
FIGS. 3a and 3b are block diagrams of sequential logic circuitry utilized in the invention.
Figure 3B:
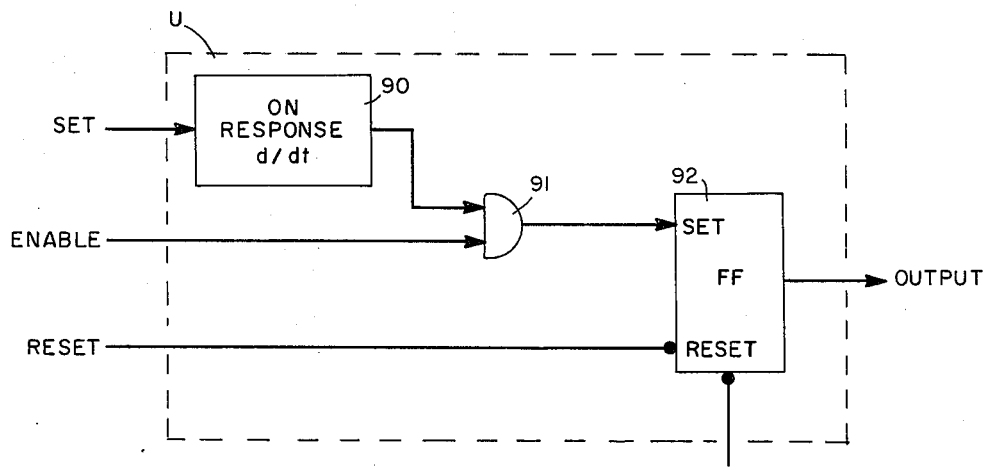

Referring to FIG. 3, there is shown a block diagram of the sequential logic circuitry 200 comprising a logic chain which, for purposes of illustration, is depicted as having four logic stages or units, $U_1$, $U_2$, $U_3$ and $U_4$, connected in series. The basic logic unit is shown in FIG. 3A and is seen to include a differentiator 90, an AND gate 91 and a flip-flop 92. The basic stage U has inputs designated "set" "enable" and "reset" inputs, and a single output. The reset input is directly coupled to the flip-flop reset terminal. A second reset input may also be provided, as shown. The "enable" input, which is typically received from a previous stage, is one input to the AND gate 91. The "set" input is received by the differentiator 90 which supplies the remaining input to AND gate 91 at the onset of a signal at the "set" input terminal. The output of AND gate 91 is coupled to the set terminal of flip-flop 92. In operation, the "enable" input must be present at the time of the "set" onset in order for the stage U to produce a high (logical 1) output. The stage U will then remain at a high output until one of the reset inputs resets flip-flop 92.

Depending on the expected feature characteristics of the command word, selected ones of the feature output lines are coupled to the "set" and "reset" terminals of the logic units to effect the desired sequential activation (or inactivation in the case of "reset" inputs). As a simplified illustration of operation, in FIG. 3 the command word to be recognized is "zero", so the feature output lines 60a associated with the phonemes /z/, /i/, /r/ and /o/ are shown as being coupled to the "set" input terminals of $U_1$, $U_2$, $U_3$ and $U_4$, respectively. The "enable" input terminals of $U_2$, $U_3$ and $U_4$ are each coupled to the output of the previous logic unit and the "enable" input terminal of $U_1$ is permanently coupled to a logical 1. Thus, each unit (except $U_1$) is enabled to be set to a logical 1 only after the previous stage has already been set to a 1. When the word "zero" is spoken, the feature extraction circuitry 60 will cause the feature output line for the phoneme /z/ to carry a 1 while the /z/ sound is being uttered. Since this line is coupled to the "set" terminal of $U_1$, $U_1$ will be set; i.e., its output will be a 1. When, subsequently, the /i/ sound is uttered, the feature extraction circuitry will generate a 1 on the particular feature output line 60a that indicates an /i/ and, since this line is coupled to the "set" input of $U_2$ and $U_2$ has been enabled by the output of $U_1$, the logic unit $U_2$ will be set and have a 1 output. The output of $U_2$ is fed back to a "reset" input of $U_1$ so that, at this point in time, $U_1$ is reset to a 0 and only $U_2$ has a 1 output stage. The subsequent utterance of the phonemes /r/ and /O/, in that order, will similarly cause the units $U_3$ and $U_4$ to be sequentially set to 1 output states. A 1 output state of logic unit $U_4$ produces an output on line 200C and indicates that the recognition criteria of the logic chain has been met. The last stage $U_4$ typically resets itself via a short delay, D. In addition to certain output lines of the feature being coupled to the "set" inputs of the logic units, one or more feature output lines are typically coupled to the "reset" inputs of the units, as is represented by the dashed lines leading to each "reset" input. These reset features, which are usually determined experimentally before the system is wired, are useful in preventing extraneous "recognitions" of words which have inherent features that would satisfy sequential "set" requirements, but have characteristic features which negate the possibility that they are the command word. The occurrence of a 1 on a feature output line that is coupled to a "reset" input of a logic unit that is presently at a 1 state, clears the 1 from the unit so that the logic chain must effectively "start over" in looking for the word.

In addition to the usage of signals on the feature output lines to achieve set and reset functions, it is known in the art that timing constraints can be judiciously utilized in the sequential logic circuitry. For example, a timed self-reset can be built into the individual units so that if the next expected "set" feature does not occur within a fraction of a second the unit will clear itself. Also, a unit can be designed to require that a feature output signal lasts a specified minimum time before a "set" is effected.

As above-stated, the exemplary connections for the command word "zero" were merely a simplified illustration of the functioning of a sequential logic chain. As an example of the type of practical complications generally encountered, consider that the word "zero" is often pronounced as /z/ → /I/ → /r/ → /o/, as well as /z → i/ → r/ → o/, where the former prounciation rhymes with "feet" and the latter pronunciation rhymes with "fit". To achieve recognition of both pronunciations, two feature output lines could be coupled to the "set" input of $U_2$; i.e., the feature output lines designating /I/ and /i/. In this manner, the occurrence of either of these features in the appropriate time in the sequence would result in $U_2$ being set.

In the present invention it is preferable that the recognition criteria of the sequential logic chain be met relatively easily since recognized "candidates" are "screened" by another portion of the system. Thus, for example, common group features can be used to set the various units of the sequential logic chain. To illustrate, the phoneme /z/ is a member of the set of common group features known as "voiced noise-like consonants" ("VNLC"). This set also includes such phonemes as /v/ and /z/. The phonemes /I/ and /i/ are members of a group known as "front vowels" ("FV") which also includes the phonemes /ϵ/ and / φ /. The phoneme /r/ is in a common group known as "Vowel-like consonants" ("VLC") which also includes the phonemes /w/ and /j/, among others. Finally, the phoneme /o/, which is complex in form, can be though of for present purposes as a "back vowel" ("BV"), a group which includes such other vowels as /U/ and /u/. Thus it is seen that from a standpoint of more broadly defined common group features the command word "zero" can be represented by the sequence VNLC → FV → VLC → BV. As noted above, the feature extraction circuitry 60 is readily designed such that specific feature output lines will carry a "high" or logical "1" signal whenever their associated common group feature is present in the input speech. Accordingly, the "set" inputs of $U_1$ through $U_4$ (FIG. 3) can be coupled to the feature output lines for the appropriate common group features rather than to the feature lines for the specific phonemes /z/, /i/, /r/ and /o/ as was previously described and set forth in FIG. 3 for illustrative purposes. The appropriate common group feature output line connections are indicated in brackets in FIG. 3. Again, it should be noted that by applying this more flexible criteria to the sequential logic chain the probability of accepting false candidates is increased, but in the present system this disadvantage is outweighed by the reduction in the probability that the actual command word might be rejected.

In the present embodiment the output of unit $U_1$ also serves as the line 200A which, it will be recalled, is coupled to the gate 350 (FIG. 1). Thus, the occurrence of a "voiced noise-like consonant" will set $U_1$ and thereby enable gate 350 to begin loading into the circuitry 70. The line 200B, which serves to carry a reset signal (FIG. 1) as previously described, is the output of an "OR" gate 210 which receives as its inputs the outputs of units $U_1$, $U_2$, $U_3$ and $U_4$. The output on line 200B will therefore normally be a 0 until $U_1$ is set to 1. At that point the output on line 200B will become a 1 and will remain at such a state as long as any of the units are at a 1 state. During sequential activation of the units by their "set" inputs, at least one of the units will always be at a 1 state. However, if a particular unit is reset before the next unit in the chain has been set (as would happen, for example, if the unit was reset by occurrence of a signal on a feature output line coupled to its "reset" input) all inputs to OR gate 210 would be 0 simultaneously and this would cause a transition in the output of OR gate 210 from a 1 to a 0. This transition on line 200B is considered a reset signal which disables gate 350 and clears the stored contents of circuitry 70, as was previously described. Stated another way, when the recognition criteria of the sequential logic chain has been violated, a reset signal on line 200B automatically acts to abort further consideration of information that had begun to be loaded into circuitry 70 when $U_1$ was activated.

Figure 4:
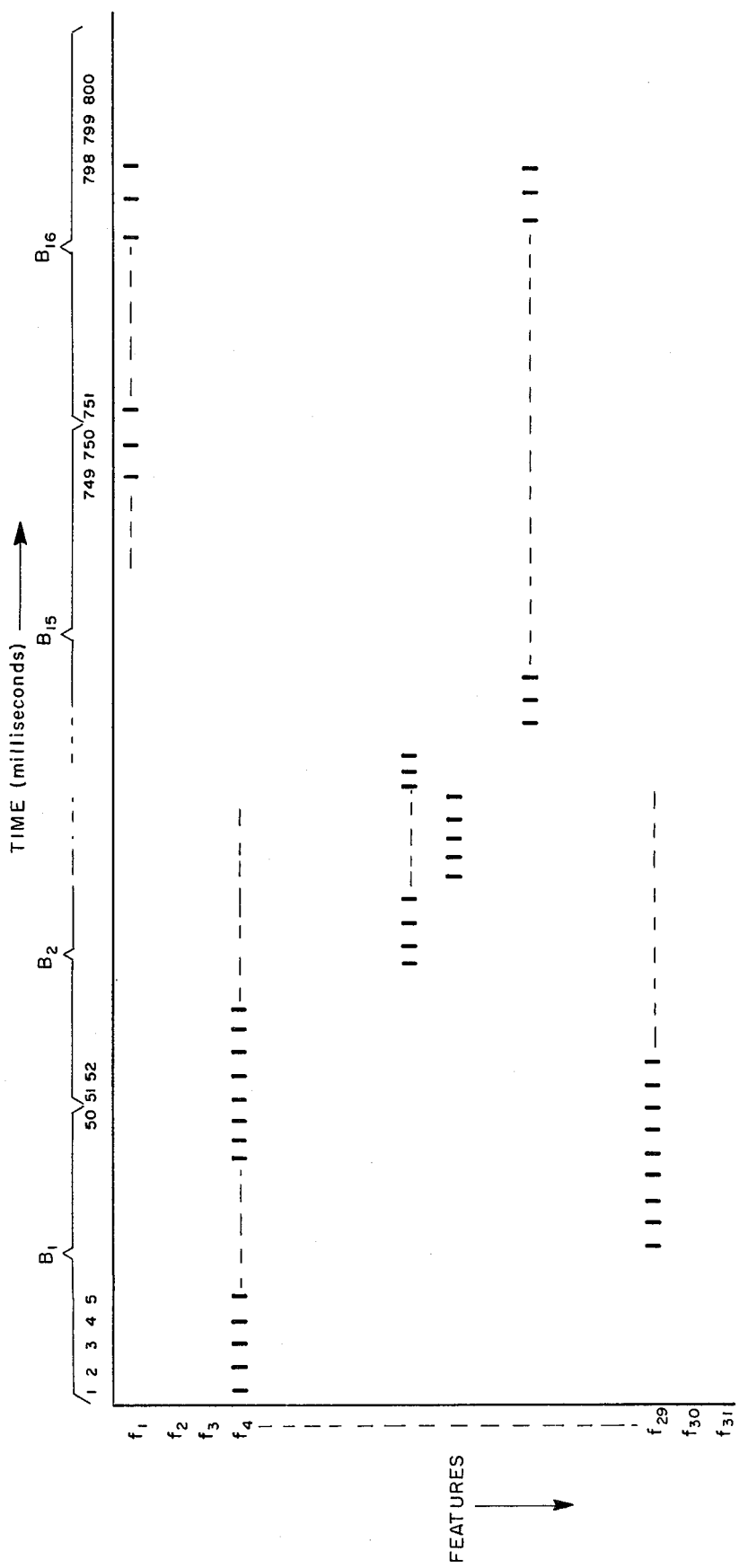
FIG. 4 helps illustrate the type of matrix that results from the storing of the status of binary features by the processing circuitry of FIG. 1.
Figure 5:
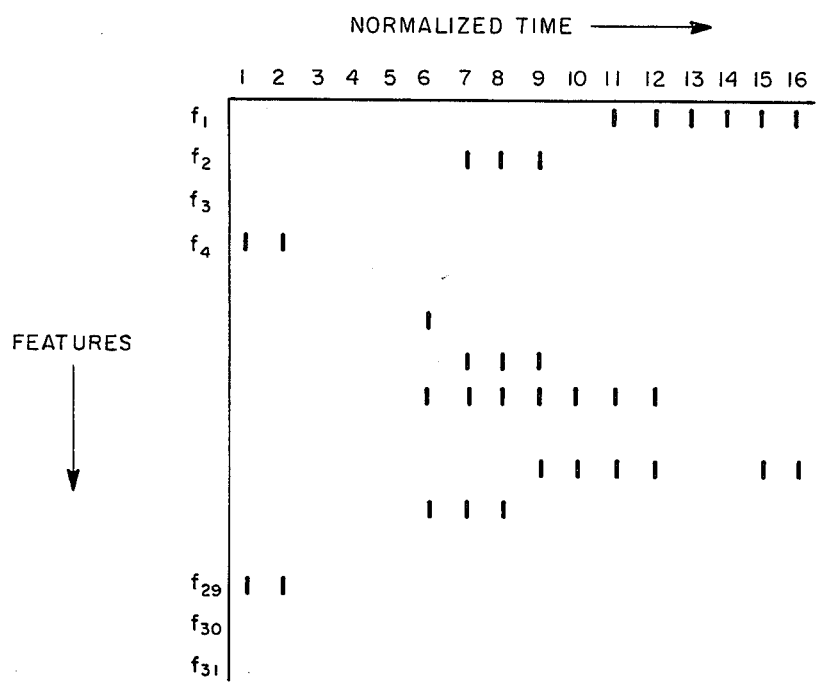
FIG. 5 helps illustrate a time normalized matrix.

FIG. 4 illustrates the operation of processing circuitry 70 by showing the type of matrix that results from storing the status of the binary features which occur during the command word candidate. In the present embodiment thirty one binary feature signals, hereinafter sometimes designated $f_1$ through $f_{31}$, are derived on thirty one feature output lines 60a and continuously indicate the presence or absence of specific features. In the example of FIG. 4 it is assumed, for purposes of illustration, that the input word had a time duration of 800 milliseconds. This means that the resultant matrix has dimensions of 31 × 800. In other words, it records the presence or absence of each of 31 features over 800 sampled "time slots", each time slot being 1 millisecond long. As is seen from the representative 1's of the FIGURE (inserted arbitararily for illustration), different features occur for varying portions of the word duration with a particular feature usually being "on" continuously for a number of milliseconds. The absence of a 1 in a matrix position inplies a 0 ; i.e., the absence of the feature. The time normalization function, performed by circuitry 70, reduces each input word matrix to a 31 × 16 matrix, the time axis being reduced down to 16 normalized time slots. The normalization can be performed in a number of ways, one technique involving the selection of the normalized time periods which include a majority of 1's. The arithmetic process for carrying out this technique is quite straightforward, basically involving simple division and counting. To illustrate, in the example of FIG. 4 the 800 time slots for each feature would be divided into groups of 50 as shown by the brackets labeled $B_1$ through $B_{16}$. Each bracket contains 50 time slots so, in this example, a particular normalized time slot for a feature will be assigned a 1 if the bracket contains at least 26 1's. In FIG. 4, the feature $f_1$ has a majority of 1's in the time included in bracket $B_{16}$. Therefore, the 16th and last normalized time slot for $f_1$ will contain a 1. An entire 31 × 16 normalized matrix is formed in this manner by examining the count of ones under each of 16 brackets for each of the 31 features. In the example given, the overall time is an exact multiple of 16, but if this is not the case, any remainder is distributed among the brackets in a specified manner. For example, if there has been originally 803 time slots (milliseconds), then each of the first three brackets would have included 51 milliseconds rather than 50, the remainder of the brackets including 50 milliseconds. FIG. 5 illustrates a typical normalized matrix for a command word candidate with the 1's again being shown and 0's being implied by the absence of a 1 at a matrix position.

A detailed description of the operation of suitable processing circuitry 70, in the form of a properly programmed general purpose computer, is set forth in the abovereference copending application Ser. No. 291,051. As indicated, a time normalized matrix is formed for the command word candidate. Before commencing operation, another time normalized matrix of this same type had been stored in the computer, as represented by the block 72. This previously stored matrix has members which represent the status of feature signals that are expected to occur characteristically during the command word and can be formed, for example, during a "training" period, as set forth in the referenced copending application. The two matrices are then compared to determine the degree of correlation therebetween, as discussed above and, again, as described in detail in the reference copending application. It should be emphasized, however, that the present invention is applicable to any processing circuitry 70 which can compare the feature signals that occurred during the specified interval with a stored set of expected features, so the invention is not limited to any particular processing circuitry 70.

Figure 6:
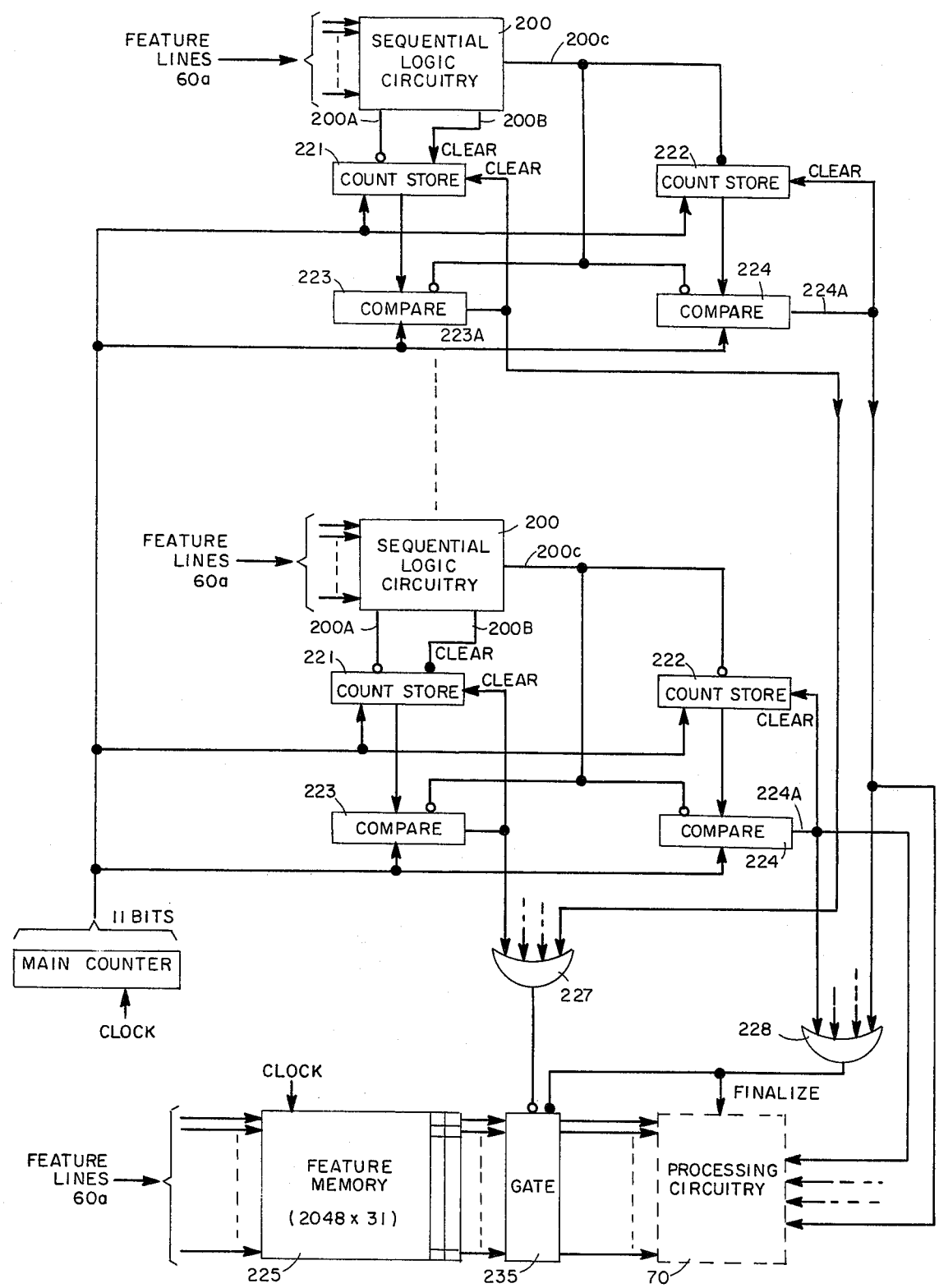
FIG. 6 is a block diagram of an apparatus in accordance with another embodiment of the invention.

It will be appreciated that the system of the type disclosed FIG. 1 can be extended to have the capability of recognizing more than one command word from among continuous speech; i.e., the system can be configured to have a multiple word vocabulary. The easiest configuration to visualize would have a single feature extraction means 10 which would feed in parallel into a number of modules, each module comprising the remainder of the blocks shown in FIG. 1 and each module being used to recognize a single predetermined vocabulary word from among the system's vocabulary. Specifically each module could comprise sequential logic circuitry 200, a buffer register 300, a gate 350, delay means 400 and processing circuitry 70. Operation of each module would be as described in conjunction with FIG. 1. While being easy to visualize, such a system would be expensive, the major reason being a duplication of the processing circuitry 70. As previously described, the functions of the processing circuitry can be performed using a general purpose minicomputer. Even in a system having a substantial vocabulary, command word candidates would arise in ordinary speech at a rate that would be within the processing capabilities of commercial minicomputers. Stated another way, the functions of matrix formation (block 71) and matrix comparison (block 73) are relatively fast compared to the rate of ordinary speech, so a single computer could readily perform these functions for command word candidates arising from a system having a multiple word vocabulary. This would appear to suggest that a single minicomputer could be successfully employed in the proposed multiple word vocabulary system. However, before this can be done the problem of storage capacity must be treated. It will be recalled from FIG. 1 that a signal on line 200A (typically, caused by occurrence of the first general feature of the command word) enables the gate 350 to begin loading into circuitry 70 (i.e., into the minicomputer memory, for present purposes). In most instances the reset signal 200B will occur thereafter, as will happen whenever the subsequent recognition criteria of the sequential logic chain is not met. In the embodiment of FIG. 1, the occurrence of the reset signal clears the feature status signals that had been stored, up to that point, in the minicomputer memory. In a system having a multiple word vocabulary, however, it would appear necessary to store the features associated with each individual vocabulary word from the time that a load signal on line 200A is first generated for that individual vocabulary word; i.e., from the time that the initial feature of the individual word is uttered. Conceivably, a number of the system's vocabulary words could be simultaneously "loading" memory, so appropriate provision should ideally be made to accomodate the system's needs without providing undue memory capacity. FIG. 6 illustrates a type of system that can be employed for multiple vocabulary word recognition.

In the embodiment of FIG. 6 there are provided a plurality of modules, one module for each of the vocabulary words of the system. Each module comprises sequential logic circuitry 200 in conjunction with count storage registers 221 and 222 and comparators 223 and 224. Only two modules are shown in the figure, but operation will be seen to apply to systems having additional modules as required by the desired vocabulary capacity. The sequential logic circuitry 200 of each module is coupled to the feature lines 60a from the feature extraction means. As described in conjunction with FIG. 3, the connections to the "set" and "reset" inputs of the logic units in each particular sequential logic circuitry will be determined a priori by the command word which is to be associated with that particular sequential logic circuitry. The thirty-one feature lines are also coupled to the thirty-one first stages of a 2048 × 31 shift register which is designated as a "feature memory" 225. This register has 31 levels and 2048 stages and is clocked by the system's basic 1 KHz clock, so each of the thirty-one digital features of the input speech propagates through the memory 225 in 2048 milliseconds. The thirty-one outputs of memory 225 are coupled, via gate 235, to processing circuitry 70 which operates in the manner of the processing circuitry of FIG. 1. Also provided is a "main counter" 245 which is an eleven bit binary counter that is stepped at a 1 KHz rate by the system's basic clock. This counter counts to 2047 (11111111111 in binary form) and is reset to zero (00000000000 in binary form) to begin recounting once every 2048 milliseconds. Thus, a full cycle of the counter 245 corresponds to the propagation cycle through the feature memory 225. In other words, when a particular set of thirty-one feature signals is entering the memory 225 the main counter 245 will be at some given count, and it follows that when the same set of feature signals is leaving the final stage of memory 225 the counter will have recycled to the same given count. A maximum command word duration of about two seconds is assumed.

The system of FIG. 6 operates by recording the reference time of occurrence (as measured by counter 245) of the beginning and end of any command word candidate. While this is being done, the feature signals (as determined by input spoken speech) are being stored in the feature memory 225. When the stored feature signals are subsequently clocked out of memory 225, the recorded times are used to control the loading of feature signals into the processing circuitry 70, the loading being controlled by enabling and disabling of gate 235. In this manner, only the features of the command word candidate which occurred during activation of its associated sequential logic circuitry are loaded into the processing circuitry 70. In the common instance where the initial criteria of a sequential logic chain is met (as would activate line 200A in FIG. 1), and then a reset signal subsequently occurs (as would activate line 200B in FIG. 1), no loading into processing circuitry 70 would be effected.

In accordance with the operation of the embodiment of FIG. 6, and referring generally to any one of the plurality of modules of which two are shown, the eleven bit count of main counter 245 is made continuously available to a pair of eleven bit count storage registers 221 and 222 and to a pair of eleven bit comparators 223 and 224. The count storage register 221 is enabled to store the current count upon the occurrence of a signal on line 200A. (If a signal occurs on line 200B, the stored count is cleared from 221.) The count stored in register 221 is available as another input to comparator 223. Upon occurrence of a signal on line 200C, the comparator 223 is enabled to generate an output signal on a line 223A when the count in main counter 245 next corresponds to the count stored in register 221. The signal on line 223A clears the register 221 and is one input to an OR gate 227 which receives its other inputs the signals on the lines 223A from all other modules. The output of OR gate 227 enables the gate 235. The signal on line 200C also enables register 222 to store the current count and enables the comparator 224. This stored count is then made abailable to comparator 224 which generates an output on line 224A when the count in the main counter 245 next corresponds to the count stored in register 222. The signal on line 224A clears register 222 and is one input to an OR gate 228 which receives as its other inputs the signals on the lines 224A from all other modules. The output of OR gate 228 disables the gate 235. The signal on line 224A is also coupled to processing circuitry 70 to indicate which of the command word candidates is being loaded into the processing circuitry so that the appropriate one of the stored matrices is selected for comparison with the loaded command word candidate data.

Operation of the system of FIG. 6 can be understood by assuming that the initial feature of a command word candidate is sensed, at a time $t_1$, by the sequential logic circuitry of the module associated with that particular command word. As previously described, this will cause generation of a signal on line 200A which, in trun, will cause the current count in main counter 245 to be stored in register 221. Assume, for convenience, that the current count in main counter 245 at time $t_1$ is 0. (Decimal counts will be used for brevity, but actual counts are all in eleven bit binary form in this embodiment.) This means that a count of 0 will be stored in register 200A. Assume further that the subsequent recognition criteria of the sequential logic circuitry under consideration is satisfied by the received speech and that a signal is generated on line 200C 1200 milliseconds later. The signal on line 200C will cause the latest count in main counter 245, that is a count of 1200, to be stored in register 222 and will also enable comparator 223 to begin looking for coincidence between 0 (stored in register 221) and the main count. Reviewing operation up to this point, the effective times of the initial and end features of the command word candidate have been stored in registers 221 and 222, respectively, and the comparators 223 and 224 have each been enabled. The features which occurred in the input speech during this time have propagated through and occupy the first 1200 stages of the feature memory shift register 225. Continuing with operation, the comparator 223 will now be dormant until the main counter has recycled to a count of 0. By this time the feature signals which had entered shift register 225 at the previous main count of 0 will have reached the last stage of register 225 since, as previously noted, the full cycle times of the main counter 245 and shift register 225 are both 2048 milliseconds. Thus, at the new main count of 0 the comparator 223 will generate a signal on line 223A which will enable gate 235 (via OR gate 227) to allow loading of processing circuitry 70, and the first feature signals loaded will be those which had entered the shift register 225 at the previous main count of 0. Loading of the processing circuitry 70 with the features of the command word candidate will continue until the main count becomes 1200 at which time the comparator 224 will generate a signal on line 224A which will, in turn, disable gate 235 (via OR gate 228) and end the loading of the processing circuitry 70. By this time, the feature signals which had entered the shift register 225 at the previous main count of 1200 will have reached the last stage of register 225 and be the last signals loaded into the processing circuitry 70. The output of OR gate 228 also serves as a "finalize" signal, as in FIG. 1, for the processing circuitry 70.

The foregoing example assumed that no reset signal on line 200B had intervened and cleared the count stored in register 221. In such event, no loading of the processing circuitry 70 would have been effected by the module in question. It should also be noted that the operation of the modules is independent and non-interfering, so long as the recognition criteria for command word candidates are mutually exclusive. When the feature signals of the command word candidate have been loaded into processing circuitry 70, a time normalized matrix is formed and compared with the appropriate stored matrix as previously disclosed.

It will be appreciated that the embodiment of FIG. 6 can be modified in the manner of the FIG. 1 embodiment to provide for loading of some features which occur slightly before the occurrence of a "start" signal on line 200A and slightly after the occurrence of an "end" signal on line 200C. This can readily be done, for example, by modifying comparison criteria of comparators 223 and 224 to provide for "early" and "late" generation of the signals 223A and 224A, respectively. Also, while a shift register type of feature memory 225 is set forth in FIG. 6, those skilled in the art will recognize that other types of memories, for example a random access memory (RAM) could be employed. If a RAM were used, the main counter could be utilized to provide addresses for features stored in the memory 225 and then the counts stored in counters 221 and 222 would effect the readout of the features stored at the appropriate addresses. An advantage of such a system would be that readout from memory could be almost instantaneous and the response delays introduced by feature memory 225 of FIG. 6 (about two seconds) would thereby by virtually eliminated. Also, the stated RAM storage function might be handled by the computer comprising circuitry 70, depending on the capabilities of the computer being utilized.

Further possible modifications within the spirit and scope of the invention will also be evident to those skilled in the art. For example, while the description of FIG. 3 deals with sequential logic that is "hard-wired" beforehand to the feature extraction means 60, a programmable sequential logic of the type set forth in the abovereferenced copending application Ser. No. 264,232 could be employed.

We claim:

1. Apparatus for recognizing the occurrence of a command word from among input speech that may be of continuous form, comprising:
   a. means for generating feature signals which depend on the features of an input word being spoken;
   b. means for sequentially processing the feature signals to determine the time interval of occurrence of a predetermined sequence of features; and
   c. means for comparing the feature signals which occur during said time interval with a stored set of features that are expected to occur characteristically during the command word to determine the degree of correlation therebetween.

2. Apparatus for recognizing the occurrence of a command word from among input speech that may be continuous in form, comprising:
   a. feature extraction means for processing the input received speech and generating feature output signals on particular ones of a number of feature output lines, the particular ones depending on the features present in an input word being spoken;
   b. a sequential logic chain which includes a plurality of logic units having logic input terminals, the logic units being sequentially activated by the presence of signals on logic input terminals;
   c. means for coupling selected ones of the feature output lines to the logic input terminals, the coupling selections depending on the characteristic features expected in the command word;
   d. means for storing, as a time dependent matrix, the status of the feature signals which are expected to occur characteristically during the command word;
   e. means for forming a time dependent matrix whose members reflect the status of feature signals that occur during a time interval determined by activation of said sequential logic chain; and
   f. means for comparing the formed matrix with the stored matrix to determine the degree of correlation therebetween.

3. A method of recognizing the occurrence of a command word from among received speech that may be of continuous form, comprising the steps of:
- a. generating feature signals which depend on the characteristic features of a word being spoken;
- b. sequentially processing the feature signals to determine the time interval of occurrence of a predetermined sequence of features; and
- c. comparing the feature signals which occur during said time interval with a stored set of features that are expected to occur during the command word to determine the degree of correlation therebetween.

4. Apparatus for recognizing the occurrence of a plurality of preselected command words from among input speech that may be continuous in form, comprising:
- a. means for generating feature signals which depend on the characteristic features of a word being spoken;
- b. a plurality of sequential logic circuits, each of which corresponds to a different one of the preselected command words and processes the feature signals to determine the time interval of occurrence of the predetermined sequence of features associated with its characteristic command word;
- c. means for storing a set of features for each preselected command word, each set containing those features that are expected to occur during the set's associated command word; and
- d. means for comparing the feature signals which occur during the time interval measured by a particular one of the sequential logic circuits with the stored set of features for the command word corresponding to the particular sequential logic circuit.

5. Apparatus for recognizing the occurrence of a plurality of preselected command words from among input speech that may be continuous in form, comprising:
- a. feature extraction means for processing the input speech and generating feature output signals on particular ones of a number of feature output lines, the particular ones depending on the features present in an input word being spoken;
- b. a plurality of sequential logic chains, each of which corresponds to a different one of the preselected command words and each of which includes a plurality of logic units having logic input terminals, the logic units being sequentially activated by the presence of signals on logic input terminals;
- c. means for coupling selected ones of the feature output lines to the logic input terminals, the coupling selections for each logic chain depending on the characteristic features expected in its corresponding command word;
- d. means for storing, as time dependent matrices, the status of feature signals which are expected to occur characteristically during each command word;
- e. means for forming a time dependent matrix whose members reflect the status of feature signals that occur during the time corresponding to activation of a particular one of said sequential logic chains; and
- f. means for comparing the formed matrix with the stored matrix for the particular command word to determine the degree of correlation therebetween.

6. Apparatus as defined by claim 5 further comprising feature memory means for storing the feature output signals from said feature extraction means during operation of said sequential chains and for selectively reading out the feature signals which occurred during activation of a particular sequential logic chain.

7. Apparatus as defined by claim 6 further comprising means for recording the active time each sequential logic chain and for controlling readout of said feature memory means in accordance with said active time.

* * * * *